(12) United States Patent
Nguyen et al.

(10) Patent No.: US 6,272,462 B1
(45) Date of Patent: Aug. 7, 2001

(54) SUPERVISED ADAPTATION USING CORRECTIVE N-BEST DECODING

(75) Inventors: Patrick Nguyen, Isla Vista; Philippe Gelin; Jean-Claude Junqua, both of Santa Barbara, all of CA (US)

(73) Assignee: Panasonic Technologies, Inc., Secaucus, NJ (US)

( * ) Notice: Subject to any disclaimer, the term of this patent is extended or adjusted under 35 U.S.C. 154(b) by 0 days.

(21) Appl. No.: 09/257,893

(22) Filed: Feb. 25, 1999

(51) Int. Cl.$^7$ ................................................. G10L 15/06
(52) U.S. Cl. .............................. 704/244; 704/243
(58) Field of Search .................... 704/243, 244, 704/245

(56) References Cited

U.S. PATENT DOCUMENTS 5,970,239 * 11/1999 Bahl et al. ........................... 704/231

OTHER PUBLICATIONS

C.J. Leggetter and P.C. Woodland, *Maximum likelihood linear regression for speaker adaptation of continuous density hidden Markov models*, Computer Speech and Language, 1995, pp. 171–185.

Jean–Luc Gauvain and Chin–Hui Lee, *Maximum a Posteriori Estimation for Multivariate Gaussian Mixture Observations of Markov Chains*, IEEE Transactions on Speech and Audio Processing, vol. 2, No. 2, Apr. 1994, pp. 291–298.

Tomoko Matsui and Sadaoki Furui, *N–Best–Based Instantaneous Speaker Adaptation Method for Speech Recognition*, NTT Human Interface Laboratories, 3–9–11, Midori–cho, Musashino–shi, Tokyo, Japan, pp. 973–975.

Chen et al, An n–best candidates–based discriminative training for speech recognition applications, IEEE, Jan. 1994, pp. 206–216.*

Chow, Maximum mutual information estimation of hmm parameters for continuous speech recognition using the n–best algorithm, IEEE, 1990, pp. 701–704.*

Korkmazsky et al, Discriminative training of the pronunciation networks, IEEE, 1997, pp. 223–229.*

Juang et al, Discriminative learning for minimum error classification, IEEE, Dec. 2, 1992, pp. 3043–3054.*

Seyed Mohammad Ahadi–Sarkani, Bayesian and Predictive Techniques for Speaker Adaptation, Jan. 1996.

M.J.F. Gales & P.C. Woodland, Variance Compensation Within The MLLR Framework, Feb. 1996.

* cited by examiner

*Primary Examiner*—Tãlivaldis Ivars Šmits
(74) *Attorney, Agent, or Firm*—Harness, Dickey & Pierce, P.L.C.

(57) ABSTRACT

Supervised adaptation speech is supplied to the recognizer and the recognizer generates the N-best transcriptions of the adaptation speech. These transcriptions include the one transcription known to be correct, based on a priori knowledge of the adaptation speech, and the remaining transcriptions known to be incorrect. The system applies weights to each transcription: a positive weight to the correct transcription and negative weights to the incorrect transcriptions. These weights have the effect of moving the incorrect transcriptions away from the correct one, rendering the recognition system more discriminative for the new speaker's speaking characteristics. Weights applied to the incorrect solutions are based on the respective likelihood scores generated by the recognizer. The sum of all weights (positive and negative) are a positive number. This ensures that the system will converge.

10 Claims, 2 Drawing Sheets

SUPERVISED ADAPTATION USING CORRECTIVE N-BEST DECODING

BACKGROUND AND SUMMARY OF THE INVENTION

The present invention relates generally to speech recognition systems. More particularly, the invention relates to speech model adaptation in a supervised system employing a corrective adaptation procedure that weights correct and incorrect models by a log likelihood ratio between current and best hypotheses.

Speech recognizers in popular use today employ speech models that contain data derived from training speakers. In many cases, training speech from these speakers is collected in advance and used to generate speaker independent models representing a cross section of the training speaker population. Later, when the speech recognizer is used, data extracted from speech of a new speaker is compared with the speaker independent models and the recognizer identifies the words in its lexicon that represent the best match between the new speech and the existing speech models.

If the new speaker's speech patterns are sufficiently similar to those of the training population, then the recognizer will do a reasonably good job of recognizing the new speaker's speech. However, if the new speaker has a strong regional accent or other speech idiosyncrasies that are not reflected in the training population, then recognition accuracy fails off significantly.

To enhance the reliability of the speech recognizer, many recognition systems implement an adaptation process whereby adaptation speech is provided by the new speaker, and that adaptation speech is used to adjust the speech model parameters so that they more closely represent the speech of the new speaker. Some systems require a significant quantity of adaptation speech. New speakers are instructed to read long passages of text, so that the adaptation system can extract the necessary adaptation data to adapt the speech models.

Where the content of the adaptation speech is known in advance, the adaptation system is referred to as performing "supervised" adaptation. Where the content of the adaptation speech is not known in advance, the adaptation process is referred to as "unsupervised" adaptation. In general, supervised adaptation will provide better results than unsupervised adaptation. Supervised techniques are based on the knowledge of the adaptation data transcriptions, whereas unsupervised techniques determine the transcriptions of the adaptation data automatically, using the best models available, and consequently provide often limited improvements as compared to supervised techniques.

Among the techniques available to perform adaptation, transformation-based adaptation (e.g., Maximum Likelihood Linear Regression or MLLR) and Bayesian techniques (e.g., Maximum A Posteriori or MAP) adaptation are most popular. While transformation-based adaptation provides a solution for dealing with unseen models, Bayesian adaptation uses a priori information from speaker independent models. Bayesian techniques are particularly useful in dealing with problems posed by sparse data. In practical applications, depending on the amount of adaptation available, transformation-based, Bayesian techniques or a combination of both may be chosen.

Given a small amount of adaptation data, one of the common challenges of supervised adaptation is to provide adapted models that accurately match a user's speaking characteristics and are discriminative. On the other hand, unsupervised adaptation has to deal with inaccuracy of the transcriptions and the selection of reliable information to perform adaptation. For both sets of techniques it is important to adjust the adaptation procedure to the amount of adaptation data available.

The present invention addresses the foregoing issue by providing a corrective adaptation procedure that employs discriminative training. The technique pushes incorrect models away from the correct model, rendering the recognition system more discriminative for the new speakers speaking characteristics. The corrective adaptation procedure will work with essentially any adaptation technique, including transformation-based adaptation techniques and Bayesian adaptation techniques, and others.

The corrective adaptation procedure of the invention weights correct and incorrect speech models by a log likelihood ratio between the current model and the best hypothesis model. The system generates a set of N-best models and then analyzes these models to generate the log likelihood ratios. Because supervised adaptation is performed, and the correct label sequence is known, the N-best information is exploited by the system in a discriminative way. In the preferred system a positive weight is applied to the correct label and a negative weight is applied to all other labels.

In comparison with other discriminative methods, the corrective adaptation technique of the invention has several advantages. It is computationally inexpensive, and it is easy to implement. Moreover, the technique carries out discrimination that is specific to a given speaker, such that convergence is not an issue.

For a more complete understanding of the invention, its objects and advantages, refer to the following specification and to the accompanying drawings. dr

DESCRIPTION OF THE PREFERRED EMBODIMENT

The present adaptation system will work with a variety of different speech recognizer implementations. Thus, for illustration purposes, a model-based recognizer is illustrated at 10 in FIG. 1. Recognizer 10 operates in conjunction with a set of speech models 12. These models are supplied in an initial form, typically a speaker-independent form. The adaptation system adapts these models based on supervised adaptation data supplied as input by the new speaker. Although there are a variety of different ways to model acoustic sounds, many recognizers in popular use today employ Hidden Markov Models to represent each of the sound units (e.g., words) within the recognizer's lexicon.

In most recognition applications the recognizer is designed to select the best solution, that is, the model that best corresponds to the input utterance. However, in this application the recognizer supplies the N-best solutions 14, that is, a predetermined fixed plural number of solutions or, alternatively, a plural number of solutions that had a recognition score greater than a predetermined threshold. In either case, recognizer 10 generates a score for each speech model, indicating the likelihood that the given model generated the input utterance. The likelihood score is used in a conventional recognizer to select the single best solution. In the present adaptation system, the N-best likelihood scores are used to generate a list of N-best solutions 14.

Because the adaptation data is provided under supervised conditions (the adaptation speech corresponds to words that are expected by the recognizer) it is possible to perform forced alignment of the input adaptation data with the correct label sequence. The adaptation system then processes these segments in an N-best pass to collect the N-most probable labels. These N-best labels are then used to adapt the speech models 12, by applying either a positive weight or a negative weight according to the following rule:

Equation 1:

$$\phi_n = \begin{cases} \kappa, & \text{if correct label} \\ -\rho e^{(L_n - L_1)\eta}, & \text{otherwise} \end{cases}$$

In the above equations $\kappa$ represents the weight given to the supervised forced alignment. It is independent of n because we want to recover the correct label the same way whatever its rank is. $L_n$ is the likelihood of the Nth-best answer. Components $\rho$ and $\eta$ control the amount of backoff that misrecognized letters receive. Ensuring that $\eta > 0$ and $\kappa > (N-1)\rho$ guarantees that for a given segment, the sum of all weights will be positive, assuming the correct label is among the N-best solutions 14. Typical values for these parameters are: $\kappa = 2$, $\eta = 00.1$ and $\rho = 0.3$.

Figure 1:
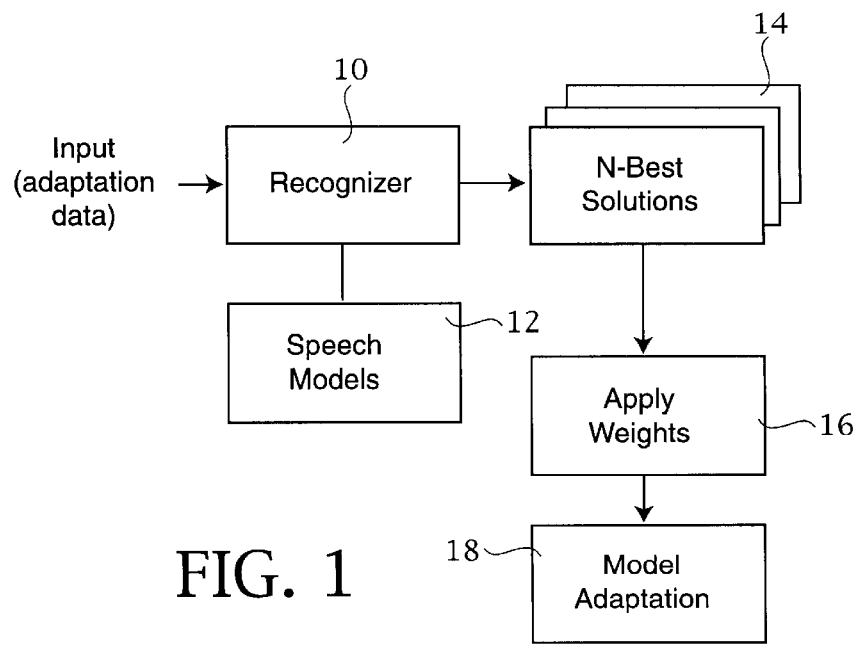
FIG. 1 is a block diagram illustrating the adaptation system of the invention in its single-pass form.
Figure 2:
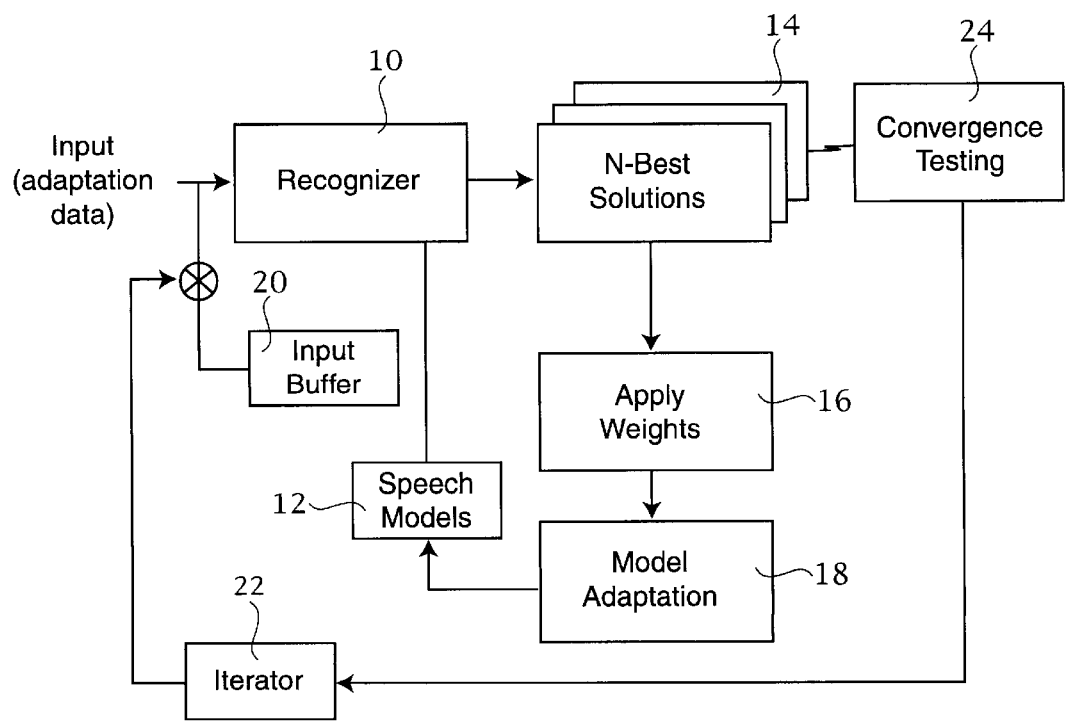
FIG. 2 is a block diagram of the adaptation system illustrating how a multiple pass system may be implemented using iteration.

The embodiment illustrated in FIG. 1 represents a single pass application of the corrective N-best decoding scheme of the invention. Iterative procedures can also be employed over the adaptation data to further improve the speech models. An iterative embodiment is illustrated in FIG. 2 and will be described more fully below.

The assigning of weights to the N-best transcriptions corresponding to their likelihoods, produces a natural information extraction and data corrective process. Reliable information corresponding to correct labels becomes enhanced by the positive weight applied. Unreliable information is correspondingly diminished in importance because of the negative weight applied. The system thus tends to push models that generate incorrect labels away from those that generate correct ones. In the preferred embodiment the system is designed such that the sum of all weights applied are positive. Doing so causes the system to converge upon an optimal adaptation solution. Were the negative weights allowed to outweigh the positive one, then the adaptation solution could, under some circumstances, diverge. This would result in an adaptation scheme that might degrade rather than improve recognition performance.

Once weights are applied to the N-best solutions as illustrated diagrammatically at 16 in FIG. 1, the weighted information is then used by the model adaptation module 18 to selectively adapt the speech models 12. In the presently preferred embodiment, model information is accumulated among the N-best transcriptions for the entire set of sentences and then used to adapt the speech models at the conclusion of the set. Alternatively, model adaptation may be performed on each sentence or even each individual word separately within a sentence.

The manner in which adaptation is performed will depend upon the adaptation technique selected. If the adaptation technique is a transformation-based technique such as MLLR, equation 2 is used to transform the mean vectors.

$$\hat{\mu} = W\mu + b, \quad \text{Equation 2}$$

In the above equation where $\hat{\mu}$ and $\mu$ are respectively the adapted and original mean vector; W and b are the transformation matrix and bias derived to optimize the maximum likelihood through the optimization of Baum's "auxiliary function" of Equation 3.

Equation 3:

$$Q(\mu, \hat{\mu}) = \sum_{\theta \in states} L(O, \theta | \mu) \log(L(O, \theta | \hat{\mu})),$$

where $L(O,\theta|\mu)$ stands for the likelihood of the observation O, and the sequences of states, $\theta$, given the specific mean vector $\mu$.

On the other hand, if the adaptation technique is a Bayesian technique such as MAP equation 4 is used to adapt the speech models.

Equation 4:

$$\mu_{MAP} = \frac{\tau\mu_0 + \sum_t \gamma(t)o_t}{\tau + \sum_t \gamma(t)},$$

In the above equation, $\tau$ is a measure of confidence on the prior ($\tau=15$ in our experiments) and $\gamma$ is the observed posterior probability of the observation.

Both adaptation techniques can be performed serially, that is, first one and then the other. The techniques of the invention support this application. Note that regardless of what adaptation technique is applied, the model adaptation procedure of the invention changes the way in which conventional adaptation techniques are applied by taking into account the incorrect solution provided by the N-best decoder and using them to emphasize the adaptation of the correct solution while deemphasizing the adaptation of the uncorrect one.

As noted above, while the adaptation system can be used in a single pass embodiment, as illustrated in FIG. 1, iteration may also be used to perform multi-pass adaptation upon the input adaptation data. One such multi-pass embodiment is illustrated in FIG. 2. The embodiment of FIG. 2 is constructed essentially as described above, in which recognizer 10 supplies the N-best solutions 14, which are then processed at 16 to extract reliable information. The information is then used to adapt the speech model at 18, using any of the techniques described above.

In the multi-pass embodiment, the input adaptation data may be stored in an input buffer 20, allowing the adaptation data to be processed multiple times after each successive adaptation is made to the model. Thus the input adaptation data is first analyzed by recognizer 10 using the initial speech models 12 and this results in modification of the speech models, as described above. Then, using the adapted speech models, the adaptation data from input buffer 20 is fed through the system again, to generate a second set of adapted speech models. The procedure is mediated by iterator 22, which causes the adaptation cycle to repeat multiple times until the system converges upon a final solution. Convergence testing module 24 analyzes the N-best solutions 14, comparing the current N-best solutions with the corresponding solutions from a previous pass. Alternatively, it can be based on number of iterations. Once the convergence testing module detects that there is very little change in either the N-best solutions, or their respective likelihood scores, the iteration process is terminated.

The adaptation system of the invention, in either its single pass form or its multi-pass form, will selectively apply the adaptation technique (or techniques) based on the known sequence as labeled and on the one provided by the N-best solutions. To further understand the invention in operation, consider the following example taken from an exemplary application in which letters are spoken to input spelled words or names. Such a system might be used in a car navigation routing apparatus, for example. In this context the recognizer is trained to recognize individual letters (functioning as words) and an entire spelled name sequence would represent a series of letters (constituting a spoken sentence).

Figure 3:
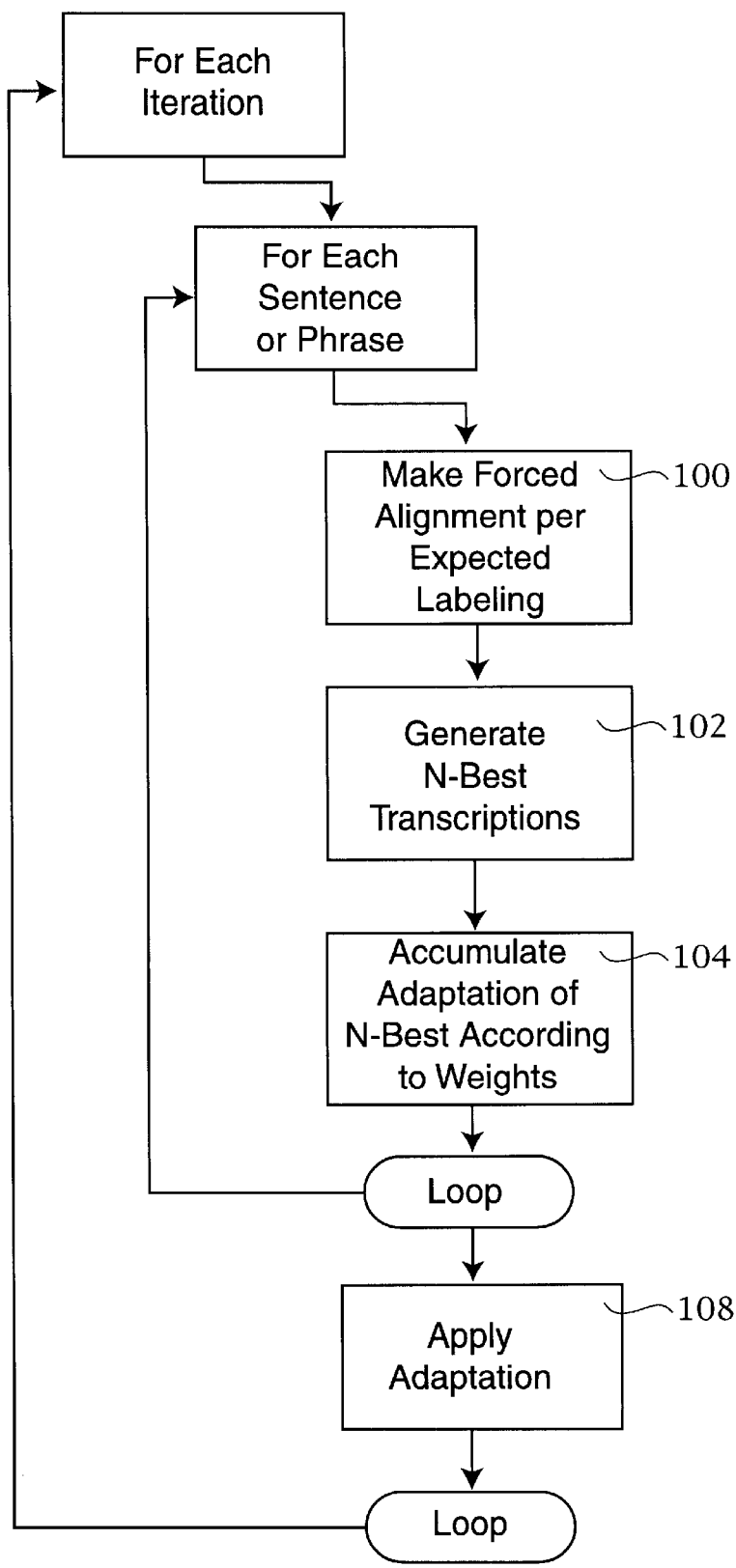
FIG. 3 is a flowchart diagram illustrating the corrective N-best decoding process of the invention.

FIG. 3 summarizes the corrective N-best decoding procedure implemented by the system's illustrated in FIGS. 1 and 2. Specifically, FIG. 3 shows the iterative solution. A single pass solution would simply execute one pass through the illustrated sequence without iteratively repeating.

Referring to FIG. 3, the system performs a forced alignment according to the expected labeling of the sentence as indicated at step 100. The expected labeling is known because the system performs supervised adaptation. Forced alignment amounts to aligning each uttered word in a spoken sequence to the words expected by the adaptation system.

Next, for each aligned segment of the sentence, the recognizer generates an N-best set of transcriptions and their corresponding likelihoods, as indicated at step 102. The likelihoods, it will be recalled, are produced as a natural bi-product of the recognition system.

Next, weights are applied according to the Equation 1 described above. A correct label is assigned a positive weight and all incorrect labels are assigned negative weights. The data are accumulated for the entire phrase as at 104. Then, the adaptation data is used at step 108 by the adaptation technique or techniques implemented in the system.

In effect, the system of the invention performs a corrective pre-processing of the adaptation data, such that adaptation of the correct solution is emphasized, using the incorrect solutions to enhance the discrimination.

In comparison with other discriminative methods, the corrective adaptation system of the invention has several advantages. It is computationally inexpensive and easy to implement. Moreover, it carries out discrimination that is specific to a speaker and convergence is not an issue. An interesting aspect of the invention is that observations associated with a negative weight can be regarded as additional observations that contribute to obtaining more reliable statistics. In other words, incorrectly labeled segments are not merely discarded. Rather, they are used to pull incorrect solutions away from the correct ones to thereby enhance the overall adaptation results.

To further illustrate the concept of corrective adaptation, consider the following example, in which the sound units being modeled correspond to individual letters and thus an input string or "sentence" would consist of a sequence of spoken letters, as if by spelling.

Assume that the correct spelling is "bop".

A first use of the recognizer allows us to segment the adaptation speech, each segment representing one spelled letter.

For each segment, we use the recognizer to extract the N-best solutions with their respective Likelihood, notes $L_{s,n}$, where s represents the segment and n the nth best solution.

Assuming the answers are, for the first segment: b,c,t,d, with their respective likelihood: $L_{1,1}, L_{1,2}, L_{1,3}, L_{1,4}$, for the second segment: e, o, u, p, with their respective likelihood: $L_{2,1}, L_{2,2}, L_{2,3}, L_{2,4}$, for the third segment: p,b,c,t, with their respective likelihood: $L_{3,1}, L_{3,2}, L_{3,3}, L_{3,4}$, According to Equation 1; we will obtain:

$$\phi_{1,1} = \kappa; \phi_{1,2} = \rho e^{(L_{1,2}-L_{1,1})\eta}; \phi_{1,3} = -\rho e^{(L_{1,3}-L_{1,1})\eta};$$

-continued $$\phi_{1,4} = -\rho e^{(L_{1,4}-L_{1,1})\eta},$$

$$\phi_{2,1} = -\rho; \phi_{2,2} = \kappa; \phi_{2,3} = -\rho e^{(L_{2,3}-L_{2,1})\eta};$$

$$\phi_{2,4} = -\rho e^{(L_{2,4}-L_{2,1})\eta},$$

$$\phi_{3,1} = \kappa; \phi_{3,2} = -\rho e^{(L_{3,2}-L_{3,1})\eta}; \phi_{3,3} = -\rho e^{(L_{3,3}-L_{3,1})\eta};$$

$$\phi_{3,4} = -\rho e^{(L_{3,4}-L_{3,1})\eta}.$$

Focusing on the model "b", its own data set will be, the first segment with a positive weight=$\phi_{1,1}$, and the third segment, with a negative weight=$\phi_{3,2}$.

In the standard adaptation techniques (MLLR, MAP), a weighting factor, $\gamma_m(t)$, called "state occupancy" is used to weight the adaptation of the model m with every frame, extracted from the adaptation speech.

In this corrective adaptation, this weighting factor is multiplied with our corrective weight, $\phi_{s,n}$.

Assuming the state occupancy of the model "b" for the first segment to be $\gamma_{1,b}^{(t)}$, the new corrective weight will be: $\gamma^o{}_{1,b}{}^{(t)} = \gamma_{1,b}{}^{(t)}\phi_{1,1}$. For the third segment: $\gamma^o{}_{3,b}{}^{(t)} = \gamma_{3,b}{}^{(t)}\phi_{3,2}$ and zero for the other segments.

In the MLLR adaptation, $\gamma_{s,m}{}^o(t)$ is used to estimate the transformation matrix, W, which is used to adapt the mean of the adapted models as followed:

$$\hat{\mu} = W\mu + b,$$

where, $\mu = [\mu_1, \mu_2, \ldots, \mu_M]^T$ is the matrix containing all the original means of the M models, $\hat{\mu} = [\hat{\mu}_1, \hat{\mu}_2, \ldots, \hat{\mu}_M]^T$ is the matrix containing all the original means of the M models and b is a biais matrix not used in out experiments.

In more details, the elements of the transformation matrix, W can be estimated by:

$$(W(i,j))^T = G_i^{-1}(Z(i,j))^T$$

where Z can be estimated with:

$$z = \sum_m \sum_s \sum_t \gamma_{s,m}(t) C_m^{-1} o(1)[1;\mu^T-]^T$$

and $G_i$ is a matrix such that its elements, $G_i(j,q)$ are estimated with $$G_i(j,q) = \sum_m V^m(i,i) D^m(j,q)$$

where $V^m(i,i)$ and $D^m(j,q)$ are the element of the matrixes:

$$V^m = \sum_s \sum_t \gamma_{s,m}(t) C_m^{-1}$$

$$D^m = [1;\mu_m^T][1;\mu_m^T]^T$$

$\mu_m$ and $C_m$ represent the current mean and inverse variance of the model m, $o_s(t)$ represent the acoustic vector extracted from the segment s at time t of the adaptation speech.

In the MAP adaptation, $\gamma_{s,m}^o(t)$ is used as followed:

$$\hat{\mu}_m = \frac{\tau \mu_m + \sum_s \sum_m \gamma_{s,m}^o(t) o_s(t)}{\tau + \sum_s \sum_m \gamma_{s,m}^o(t)}$$

While the invention has been described in its presently preferred embodiments, it will be understood that the invention is capable of modification without departing from the spirit of the invention as set forth in the appended claims.

What is claimed is:

1. A method for adapting the speech models for a speech recognizer comprising:
   supplying supervised speech to a recognizer having a predetermined set of trained speech models;
   using the recognizer to generate the N-best transcriptions of said supervised speech;
   using a priori knowledge of the supervised speech to designate a first one of said N-best transcriptions as the correct transcription and to designate the remainder of said N-best transcriptions as incorrect transcriptions;
   applying a positive weight to said first one of said N-best transcriptions and applying negative weights to said remainder of said N-best transcriptions to thereby generate a set of weighted transcriptions wherein a sum of the positive weight and the negative weights is a positive number; and
   using said weighted transcriptions to adapt the speech models based on an expectation maximization technique.

2. The method of claim 1 wherein said recognizer generates likelihood scores for each of said N-best transcriptions and wherein said negative weights are based on said likelihood scores.

3. The method of claim 1 wherein said weighted transcriptions are used to perform a transformation-based adaptation.

4. The method of claim 3 wherein said weighted transcriptions are used as observation data to generate a transformation matrix that optimizes the maximum likelihood.

5. The method of claim 1 wherein said weighted transcriptions are used to perform Bayesian adaptation.

6. The method of claim 5 wherein said weighted transcriptions are used as observation data.

7. The method of claim 1 wherein supervised speech has associated labels and said step of using a priori knowledge is performed by forced alignment of said supervised speech with said labels.

8. The method of claim 1 wherein said supervised speech comprises a phrase or sentence and wherein said method further comprises iteratively accumulating a plurality of said sets of weighted transcriptions over said phrase or sentence.

9. The method of claim 8 further comprising using said accumulated plurality of sets of weighted transcriptions to adapt said speech models.

10. The method of claim 1 wherein said supervised speech has associated labels and wherein the step of generating the N-best transcriptions is performed by:
    using said recognizer to segment said supervised speech;
    performing forced alignment of said segments with said labels to generate aligned segments; and
    generating N-best transcriptions as the N-best solutions for each of said aligned segments.

* * * * *